Nov. 28, 1961    L. H. PEAVEY, JR    3,010,425
LOOP-TYPE INSTRUMENT SCALE AND THE LIKE
Filed Jan. 20, 1960    2 Sheets-Sheet 1

INVENTOR.
LAWRENCE H. PEAVEY, JR
BY
ATTORNEYS

Nov. 28, 1961  L. H. PEAVEY, JR  3,010,425
LOOP-TYPE INSTRUMENT SCALE AND THE LIKE
Filed Jan. 20, 1960  2 Sheets-Sheet 2
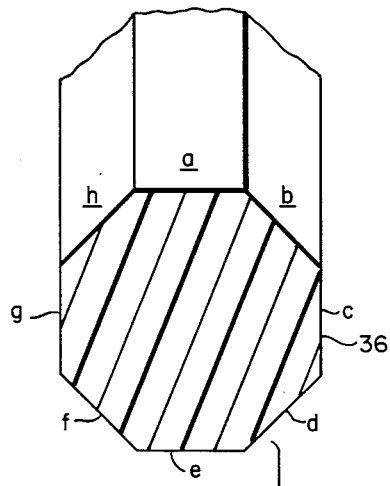
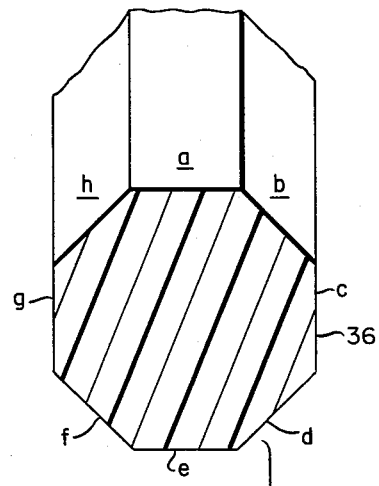
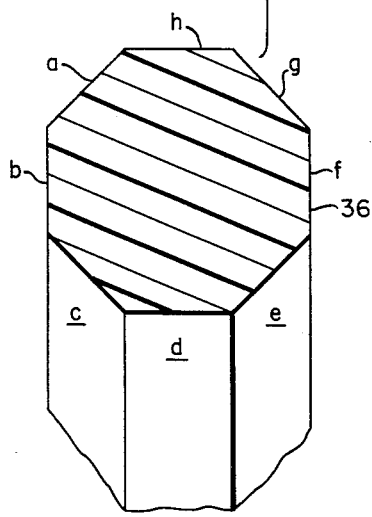
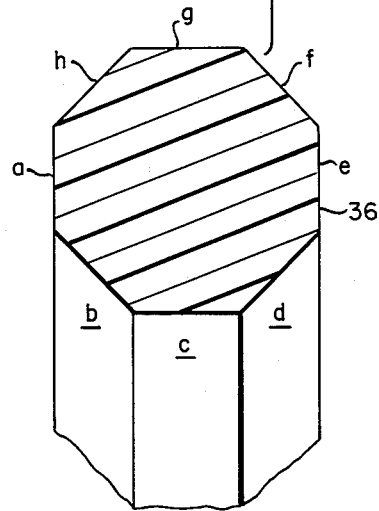
FIG. 4
FIG. 5
*INVENTOR.*
LAWRENCE H. PEAVEY, JR.
BY
ATTORNEYS

United States Patent Office 3,010,425
Patented Nov. 28, 1961

3,010,425
LOOP-TYPE INSTRUMENT SCALE AND THE LIKE
Lawrence H. Peavey, Jr., Sudbury, Mass.
Filed Jan. 20, 1960, Ser. No. 3,631
11 Claims. (Cl. 116—135)

This invention relates generally to loop scales for use in measuring or controlling instruments and like devices and, more particularly, to a novel and improved loop scale device which provides a marked increase in effective scale length without an attendant over-all increase in size.

It is known to provide a movable scale for use in a measuring instrument or the like by the use of a strip of relatively thin material, such as paper or cloth, which is arranged in a circular or cylindrical manner to form an endless loop. The loop is usually arranged over a pair of drums or pulleys, with information being provided on the outer surface of the looped strip. This information may be printed numeric indicia where the loop is to be used as a dial in an electronic instrument. A fixed indicator member is generally provided along one course of the strip to cooperate with the indicia thereon for visual reading of the dial. The effective length of the indicia bearing surface of the scale is, of course, the circumference of the outer surface of the loop. In the past, when it has been desired to increase the effective length of the information bearing surface of such a loop-type instrument scale, it has been the practice to increase the circumference of the loop, resulting in a corresponding increase in the size of the device. However, the space requirements in an instrument of the type with which the dial is to be used often preclude an increase in the size of the scale. Thus, it has been necessary to resort to other more complicated and often more costly means for providing a greater effective length for the scale.

It is a primary object of my invention to provide a novel and improved loop-type instrument scale in which the effective length of the information bearing surface of the loop is greatly increased without any increase in the over-all size of the loop.

In one aspect of my invention, the above object is achieved in a numeric indicia bearing loop-type scale comprising an elongated flexible member having a polygonal cross section and having its ends connected to form an endless loop. Before the ends of the flexible member are connected to form the loop, they are angularly offset about the longitudinal axis of the flexible member in an amount equal to $$\frac{1}{N} \times 360°$$

where N is the number of faces or flat surfaces of the flexible member. The loop formed by connecting the ends of the flexible member is engaged over a pair of sheaves having parallel spaced apart axes. Sufficient tension is placed on the loop by the sheaves so that rotation of one of them results in movement of the loop in the direction of the longitudinal axis of the member forming the loop. With the loop so arranged on the sheaves, there will be a twist in the flexible member which will be located and will remain located in one of the courses of the loop extending between the sheaves. An indicator or pointer is located along the side of the outwardly facing surface of the untwisted course of the loop.

With a loop scale constructed as described, as the loop member is moved in a direction of the longitudinal axis of the flexible member, the flat indicia bearing surfaces of the loop member will be angularly displaced $$\frac{1}{N} \times 360°$$

as the surfaces pass along the twisted course of the loop. Accordingly, at the pointer location there will be presented a continuous or endless single indicia bearing surface having a length equal to N times the length of any one of the flat surfaces of the original flexible member prior to forming the loop. Therefore, it can be seen that a loop-type scale constructed in accordance with this invention will have an information bearing surface which has an effective length of N times the effective length of the information bearing surface of a conventional loop scale.

I recognize that it is known to form a thin strip of flexible material into a Möbius band to obtain an extended surface for a sound reproducing member in the nature of a phonograph record. Such a construction is, for example, shown in United States Patent No. 1,853,895. However, there has been no teaching that an extended surface loop for audio reproduction or the like may be provided by the use of a flexible loop member having a polygonal cross section of three or more sides, the loop member having a single twisted position, the opposite ends of which are angularly offset $$\frac{1}{N} \times 360°$$

where N is equal to the number of sides of the cross section of the loop.

Also, of course, it is known to twist a conventional closed loop such as a drive belt in order to present alternate surfaces to a pair of pulleys or to provide reverse direction of rotation between two pulleys connected by the belt. However, it will be apparent that belts twisted in this manner will not provide the extended continuous surface of a loop made according to my invention. The above as well as other aspects of my invention will be described in detail in the following description, which should be taken in connection with the accompanying drawing in which:

FIG. 4 is a fragmentary perspective view of a loop member constructed in accordance with another aspect of my invention; and FIG. 5 is a fragmentary perspective view of a loop member constructed in accordance with still another aspect of my invention.

Figure 1:
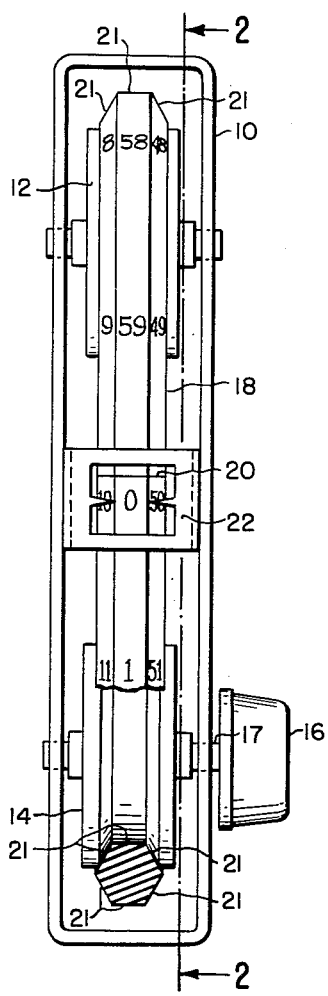
FIG. 1 is an elevation, partially broken away, of a loop-type instrument scale constructed in accordance with my invention.
Figure 2:
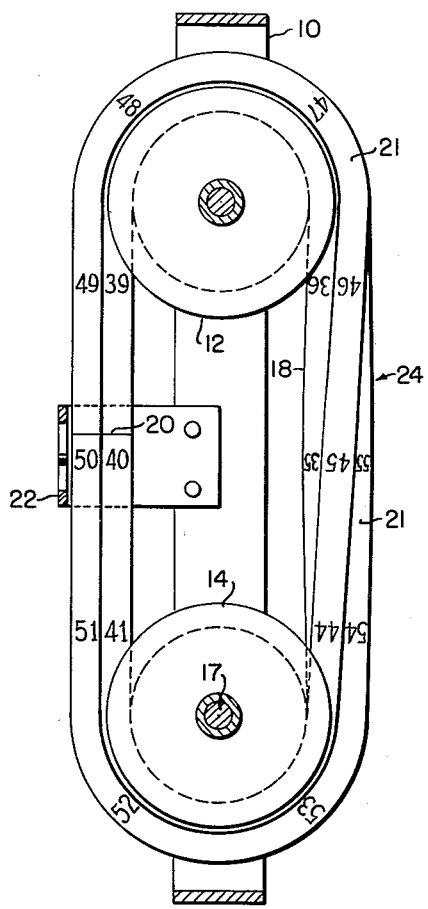
FIG. 2 is a sectional view of the device of FIG. 1 substantially along the line 2—2 of FIG. 1.

With reference to the drawing, and particularly to FIGS. 1 and 2, a loop-type scale or dial constructed in accordance with one aspect of my invention comprises a frame 10 on which is journalled a pair of sheaves or pulleys 12 and 14 having spaced-apart parallel axes. A knob or handle 16 is fixed for movement with the sheave 14 to provide for rotation of the sheave in response to rotation of the knob or handle. A controlled device (not shown) may also be connected to be driven with the knob 16 if desired. It is also to be understood, of course, that the shaft 17 which supports the sheave 14 may be driven by a motor or like device. Engaged over the sheaves 12 and 14 is an elongated flexible member 18 forming an endless closed loop. The loop scale 18 is frictionally engaged with the sheaves 12 and 14; thus, rotation of the driving sheave 14 causes the loop to be advanced about the sheaves in the direction of the longitudinal axis of the flexible member forming the closed loop, or, in other words, circumferentially of the loop member.

The loop member 18 is provided with a multi-sided cross section including a plurality of sides of equal length arranged equiangularly about the axis of the flexible member forming the loop. More specifically, the loop member of the specific embodiment shown has a regular hexagonal cross section. Accordingly, the flexible member has six faces 21 of equal width disposed equiangularly about the longitudinal axis of the flexible member forming the loop and extending longitudinally thereof. The flat surfaces or faces of the loop or scale member 18 are provided with indicia in the form of numerals which are spaced apart longitudinally of the flat surfaces. A fixed indicator or pointer 22 is carried by the frame 10 alongside one of the faces of the flexible member and cooperates with the indicia on the loop scale to provide a reference point for the scale. In accordance with the invention, the loop 18 is provided in one portion thereof with a twist generally indicated at 24. The twist of the loop member is about the longitudinal axis of this portion of the loop member. Where it is desired, as in the case of the embodiment of FIG. 1, to provide a single, endless, information bearing surface about the loop member, the angle of twist is equal to $$\frac{M}{N} \times 360°$$

where N is equal to the number of sides or faces of the loop member, and M is one or an integer less than N which is not evenly divisible into N and is not a multiple of such an integer. In the embodiment, M is equal to 1, and the angle of twist is thus 60°. The remainder of the loop member is untwisted.

While the loop member might be formed by molding or similar processes, it is preferred to form it from an elongated flexible non-metallic member the ends of which are joined as at 20 in end-to-end abutment and in cross sectional alignment or registry. In other words, the end of each face 21 is in aligned registry with the end of a face 21. However, in accordance with the aspect of my invention wherein a single information bearing surface is desired, prior to joining of the ends of the flexible member forming the loop, the ends of the flexible member were angularly offset about the longitudinal axis of the flexible member an amount equal to $$\frac{1}{N} \times 360°$$

The ends of the flexible member were then suitably permanently joined, such as by cementing, to form the continuous endless loop 18. Thus, when the loop is engaged over the sheaves 12 and 14, it will have a twist in one of its courses extending between the sheaves. As clearly shown in FIG. 2, the loop is arranged so that this twist appears in the course disposed opposite the pointer 22.

As the loop member 18 is advanced, the flat surfaces or faces of the loop in the twisted course of the loop will be angularly indexed about the longitudinal axis of the flexible member forming the loop in an amount equal to $$\frac{1}{N} \times 360°$$

during passage of the loop along the twisted course 24. For this reason, the information bearing surface of the loop as presented to the pointer 22 will have a length equal to the combined lengths of all of the faces of the original flexible member forming the loop.

This concept may be more readily apparent if the reader considers that the faces of the polygonal flexible member forming the loop are provided with numerical indicia before the angular offsetting and joining of the ends of the flexible member. Assume a first of the faces has the indicia of 0 to 9; a next adjacent face has the indicia 10 to 19; and so on, with the lowest number in each series being adjacent the same end of the flexible member. In the specific embodiment, this will then provide six faces each bearing ten indicia through the number 59. With the ends of the flexible member angularly offset as described above, the face bearing the numerals 0 to 9 is contiguous with the face bearing the numerals 10 to 19. The end of the first face adjacent the numeral 9 will then be joined with the end of the second face adjacent the numeral 10. There will thus be a continuous surface between the numerals 9 and 10, as clearly shown in FIG. 1. There will, of course, be a corresponding continuity between the remaining faces of and numeric series on the flexible member.

As will further be apparent from FIGS. 1 and 2, each of the sheaves guides the loop 18 on the flat face so that the loop is untwisted except for the twist in one course provided by the angular offsetting of the ends of the flexible member forming the loop. The integral twisted portion of the loop, mentioned above, is located in the loop course opposite the pointer 22. During advance of the loop, this apparent twisted portion will remain in the loop course opposite the pointer and will not travel around either of the sheaves, so that as any portion of the loop is passed along the twisted course it will be angularly displaced about the longitudinal axis of the flexible member forming the loop. For example, as will be apparent from FIG. 2, the portion of the surface of the loop bearing the numerals 52—53 will, when the scale is advanced one-half the circumference of the loop in the direction of the arrow of FIG. 2, be displaced from its illustrated oblique position relative to the outermost face of the loop to a new position wherein it will be a portion of the outermost surface of the loop and will be in cooperating registry with the pointer 22 on further advance of the loop. Thus it can be seen that in the case of the specific embodiment shown the effective length of the loop has been increased six times over the effective length of a conventional loop scale having a corresponding circumference.

As should be apparent from the above, the angular offsetting of the ends of the flexible member forming the loop member by one $$\frac{1}{N} \times 360°$$

in either direction about the axis of the flexible member, will result in providing a single endless information bearing surface having a length of $N \times C$, where C is the circumference of any one face of the loop if the loop were not twisted as described. However, as will be shown in connection with FIG. 4, a single endless surface may be also provided by offsetting the ends of the flexible member in amounts other than $$\frac{1}{N} \times 360°$$

In FIG. 4 is shown a loop forming flexible member 36 of an octagonal cross section having faces identified by the reference letters a–h inclusive. As shown in FIG. 4, the ends of the flexible member are offset about the axis of the flexible member an amount equal to $$\frac{M}{N} \times 360°$$

where $M=3$ and $N=8$ so that the angle of offset is 135°. Accordingly, one end of the face a is contiguous with one end of the face f; the opposite end of the face f is contiguous with one end of the face c; the other end of the face c is contiguous with one end of the face h; and so on until the face a is again reached. Inasmuch as the same result will be achieved regardless of the direction of offsetting, it will be apparent that in the case of an octagonal cross sectioned flexible member, a single endless surface will be provided where $M=1, 3, 5$ or $7$, all of which with the exception of 1 are not evenly divisible into N where $N=8$.

With reference to FIG. 5, the ends of the member 36 are offset by $$\frac{M}{N} \times 360°$$

where $M=2$ and $N=8$ so that the angle of offset is 90°. In the embodiment of FIG. 5, one end of the face $a$ is contiguous with one end of the face $g$; the opposite end of the face $g$ is contiguous with one end of the face $e$; the other end of the face $e$ is contiguous with one end of the face $c$, the opposite end of which is contiguous with the face $a$. Thus there are provided two separate endless surfaces on the loop member, each having a length equal to 4C. As should be apparent from the above, an offset of the ends of the member 36 of FIG. 5 in an amount equal to $$\frac{M}{N} \times 360°$$

where $M=4$ will result in four separate endless surfaces being provided, each having a length equal to 2C. Also, as in the embodiment of FIG. 4, the direction of offsetting of the ends of the flexible member will not affect the result achieved. Thus, where M is greater than 1 and is equal to 2 or 4, both of which are integers evenly divisible into N when $N=8$, or where $M=6$, which is a multiple of 2, there will be provided a plurality of endless surfaces on the loop member. It will be understood that the same result will be achieved with polygonal cross sections having different numbers of sides from the flexible member of FIG. 5. Thus, a plurality of endless surfaces will be provided when the offset is $$\frac{M}{N} \times 360°$$

where M is greater than 1 and less than N and is an integer evenly divisible into N or a multiple of such an integer. While M has been described in connection with FIGS. 1, 4, and 5 in terms of being less than N, it will be understood that this description of M is intended to include the case when the offset is $$\frac{X}{N} \times 360°$$

where X equals $N+M$, or, in other words, where the offset is greater than 360°.

Figure 3:
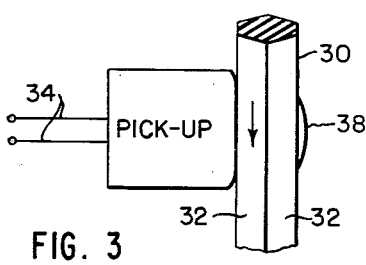
FIG. 3 is a fragmentary generally schematic view of an alternative embodiment of my invention.

In FIG. 3 there is shown an example of an alternative embodiment of the invention comprising a regular polygonal cross sectioned loop member 30 constructed similarly to the previously descriped loop 18. In the interest of brevity, only a section of the loop 30 is shown, and the means for supporting and advancing the loop have been omitted. The supporting and advancing means for the loop may be of any suitable type, such as the friction drive shown in FIGS. 1 and 2; although, as will be apparent to those skilled in the art, a positive drive may be provided if desired, such as by providing cogs, teeth, notches, holes, etc., on the faces of the loop member with a cooperating element being provided. The faces 32 of the loop 30 are, in the embodiment of FIG. 3, not provided with numeric indicia as in the case of the faces of the loop 18 but rather bear information which is not visually readable, for example magnetically recorded information or information readable by optical means. A writing or reading head or pickup may be used to record or read the data on the information bearing surfaces 32 with the pickup being connected through leads 34 to a suitable device (not shown). Also, if desired, the information bearing surfaces may be irregular so as to form a cam or the like such as shown at 38, which may be used to mechanically actuate a control mechanism or other suitable device (not shown).

While the present invention has been described in terms of the specific embodiments disclosed, it will be apparent to those skilled in the art that further modifications and alterations might be made in the structure disclosed without departing from the present invention. Accordingly, the foregoing description and accompanying drawings are to be taken only in an illustrative sense and not as limiting the invention.

Having thus described the invention, I claim:

1. In apparatus of the type described, in combination, a flexible closed loop member provided in any fractional portion of the length thereof with a plurality of faces of equal width extending longitudinally of said portion and equiangularly disposed about the longitudinal axis of said portion and forming over the complete circumference of the loop member a single continuous information bearing surface extending N times around the loop member where N is the number of faces in said portion and is equal to 3 or a larger whole number, and means supporting said loop member for movement in a direction circumferentially of said loop member.

2. In apparatus of the type described, in combination, a flexible closed loop member having a polygonal cross section of N sides where N is equal to 3 or a larger whole number and being characterized by a portion of said loop member being twisted about the longitudinal axis of said portion so that the opposite ends of said portion are angularly offset in an amount equal to $$\frac{M}{N} \times 360°$$

where M is less than N and is the number one or an integer which is not evenly divisible into N and is not a multiple of such an integer and further being characterized by the remainder of said loop member other than said portion being untwisted, and means supporting said loop member for movement in a direction circumferentially of said loop member.

3. In apparatus of the type described, in combination, a flexible elongated member having a cross section bounded by a plurality of angularly related sides disposed angularly about the longitudinal axis of said member, means joining the ends of said member in cross sectional alignment with the ends of said member being offset angularly about the axis of said member $$\frac{M}{N} \times 360°$$

where N equals the number of said sides and is a whole number greater than 2 and where M is less than N and is the number one or an integer which is not evenly divisible into N and is not a multiple of such an integer, and means supporting said member for movement in the direction of the longitudinal axis of said member.

4. In apparatus of the type described, in combination, a flexible closed loop member provided in a fractional portion of the length thereof with a plurality of faces extending longitudinally of said portion, said faces forming a plurality of information bearing surfaces each of which extends L times around the loop where L is a whole number greater than one, and means supporting said loop member for movement in a direction circumferentially of said loop member.

5. In apparatus of the type described, in combination, a flexible closed loop member having a polygonal cross section of N sides and being characterized by a portion of said loop member being twisted about the longitudinal axis of said portion so that the opposite ends of said portion are angularly offset in an amount equal to $$\frac{M}{N} \times 360°$$

where M is less than N and greater than one and is an integer which is evenly divisible into N or a multiple of such an integer, the remainder of said loop member other than said portion being untwisted, and means supporting said loop member for movement in a direction circumferentially of said loop member.

6. In apparatus of the type described, in combination, a flexible elongated member having a cross section bounded by a plurality of angularly related sides disposed angularly about the longitudinal axis of said member, means joining the ends of said member in cross sectional alignment with said ends being angularly offset about said axis.

$$\frac{M}{N} \times 360°$$

where N is the number of said sides and M is greater than one and less than N and is an integer evenly divisible into N or a multiple of such an integer, and means supporting said member for movement in the direction of the longitudinal axis thereof.

7. A loop-type scale device comprising, in combination, a flexible closed loop member having a multi-sided cross section including a plurality of sides, a portion of said loop member being twisted about the longitudinal axis of said portion so that the opposite ends of said portion are angularly offset in an amount equal to $$\frac{M}{N} \times 360°$$

where N equals the number of said sides and M is less than N and is the number one or an integer which is not evenly divisible into N and is not a multiple of such an integer, the remainder of said loop member other than said portion being untwisted about the longitudinal axis of said remainder whereby there is provided an endless outer surface on said loop member having a length equal to N times the circumference of said loop member, said endless surface being provided with indicia, indicator means disposed alongside a portion of said endless surface for cooperation with said indicia, and means mounting said loop member for movement in a direction circumferentially thereof and relative to said indicator means.

8. A loop-type scale device comprising a flexible closed loop member having a regular polygonal cross section of N sides whereby N equals 3 or a larger whole number, said loop member being characterized by a portion thereof being twisted about the longitudinal axis of said portion so that the opposite ends of said portion are angularly offset in an amount equal to $$\frac{M}{N} \times 360°$$

where M is less than N and is the number one or an integer which is not evenly divisible into N and is not a multiple of such an integer, said loop member further being characterized by the remainder of said loop member other than said portion being untwisted about the longitudinal axis of said remainder whereby there is provided a continuous outer surface on said loop member having a length equal to N times the circumference of said loop member, said continuous surface being provided with indicia, indicator means disposed alongside a portion of said continuous surface for cooperation with said indicia, and means mounting said loop member for movement in a direction circumferentially thereof and relative to said indicator means.

9. A loop-type scale device comprising a flexible elongated member having a plurality of faces extending longitudinally thereof and being disposed angularly about the longitudinal axis of said member, the ends of said member being joined in end-to-end abutment to form a closed loop with the ends of said member being angularly offset about the axis of said member and relative to each other in an amount equal to $$\frac{M}{N} \times 360°$$

where N equals the number of said faces and is equal to 3 or a larger whole number and where M is less than N and is the number one or an integer which is not evenly divisible into N and is not a multiple of such an integer, each of said faces bearing indicia spaced longitudinally of said member, means mounting said loop for movement in a direction circumferentially thereof, and indicator means disposed alongside said loop in cooperative relationship with one of the faces of said member.

10. A loop-type scale device comprising, in combination, a flexible closed loop member having a multi-sided cross section including a plurality of sides, a portion of said loop member being twisted about the longitudinal axis of said portion so that the opposite ends of said portion are angularly offset in an amount equal to $$\frac{M}{N} \times 360°$$

where N equals the number of said sides and where M is greater than one and less than N and is an integer which is evenly divisible into N or is a multiple of such an integer whereby there are provided on said loop member a plurality of endless surfaces extending around said loop member and each having a length greater than the circumference of said loop member, each providing indicia spaced along said surfaces, indicator means in cooperative relationship with the indicia on at least one of said surfaces, and means mounting said loop member for movement in a direction circumferentially thereof and relative to said indicator means.

11. A loop-type scale device comprising a flexible elongated member having a plurality of faces extending longitudinally thereof and being disposed angularly about the longitudinal axis of said member, the ends of said member being joined in end-to-end abutment to form a closed loop with the ends of said member being angularly offset about the axis of said member and relative to each other in an amount equal to $$\frac{M}{N} \times 360°$$

where N equals the number of said sides and where M is greater than one and less than N and is an integer which is evenly divisible into N or is a multiple of such an integer whereby there are provided on said loop member a plurality of endless surfaces extending around said loop member and each having a length greater than the circumference of said loop member, each providing indicia spaced along said surfaces, indicator means in cooperative relationship with the indicia on at least one of said surfaces, and means mounting said loop member for movement in a direction circumferentially thereof and relative to said indicator means.

References Cited in the file of this patent
UNITED STATES PATENTS

| | | |
|---|---|---|
| 1,711,980 | Andres | May 7, 1929 |
| 2,122,855 | Bombard | July 5, 1938 |
| 2,564,326 | Dray | Aug. 14, 1951 |